UNITED STATES PATENT OFFICE.

WILLIAM S. WELCH, OF WESTFIELD, NEW JERSEY.

IMPROVEMENT IN SIZE FOR CALCIMINING.

Specification forming part of Letters Patent No. 199,242, dated January 15, 1878; application filed October 31, 1877.

*To all whom it may concern:*

Be it known that I, WILLIAM S. WELCH, of Westfield, in the county of Union and State of New Jersey, have invented a new and Improved Liquid Size for Calcimining, of which the following is a specification:

This invention is designed to furnish to painters and others a prepared liquid size for being mixed with the calcimining colors, so as to be available for use at any moment, in place of the liquid glue hitherto used for that purpose.

The invention consists of a solution of a vegetable gum and glue in boiling water, mixed with spirits of turpentine.

The liquid size is prepared in the following manner, and in about the proportions specified: three to six ounces of Irish moss, gum tragacanth, or other vegetable gum are dissolved in three quarts, and six ounces of glue are separately dissolved in one quart, of boiling water, both solutions being then mixed with one-half pint of spirits of turpentine.

The turpentine acts as the preservative agent, while the vegetable gum imparts a certain liquidity and softness to the size, so that it will easily flow, and not assume the jelly-like condition of glue.

The size is capable of preservation for any length of time, and may be used directly with the calcimining colors in place of glue, but without having the annoying features of the latter.

The size is of great convenience for calciminers, as it is prepared ready for use, and may be mixed directly with the colors at the place of using, and the colors so mixed preserved longer without spoiling.

Having thus described my invention, I claim as new and desire to secure by Letters Patent—

A liquid size for calcimining, composed of an aqueous solution of a vegetable gum or gums and glue, and of spirits of turpentine, substantially as and for the purpose set forth.

WILLIAM S. WELCH.

Witnesses:
PAUL GOEPEL,
C. SEDGWICK.